US007225170B1

(12) United States Patent
Ryan, Jr.

(10) Patent No.: US 7,225,170 B1
(45) Date of Patent: May 29, 2007

(54) POSTAGE METERING SYSTEM FOR USE WITH BUSINESS REPLY MAIL

(75) Inventor: Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 637 days.

(21) Appl. No.: 09/626,954

(22) Filed: Jul. 27, 2000

(51) Int. Cl.
*G06F 17/00* (2006.01)

(52) U.S. Cl. .................................................. 705/401

(58) Field of Classification Search .......... 705/40–411, 705/1, 26; 400/76; 700/225–227; 209/584; 235/375–381

See application file for complete search history.

(56) References Cited

U.S. PATENT DOCUMENTS

| | | | | | |
|---|---|---|---|---|---|
| 4,743,747 | A | * | 5/1988 | Fougere et al. | 235/375 |
| 4,780,835 | A | | 10/1988 | Sievel et al. | |
| 5,207,373 | A | * | 5/1993 | Tighe | 229/300 |
| 5,319,562 | A | * | 6/1994 | Whitehouse | 705/403 |
| 5,324,927 | A | * | 6/1994 | Williams | 209/584 |
| 5,520,990 | A | * | 5/1996 | Rotermund | 281/5 |
| 5,612,889 | A | * | 3/1997 | Pintsov et al. | 700/226 |
| 5,642,855 | A | * | 7/1997 | Michlin | 229/305 |
| 5,781,438 | A | | 7/1998 | Lee et al. | 364/464.14 |
| 5,781,634 | A | | 7/1998 | Cordery et al. | 380/25 |
| 5,801,944 | A | * | 9/1998 | Kara | 705/401 |
| 5,835,689 | A | | 11/1998 | Braun et al. | 395/113 |
| 5,953,427 | A | | 9/1999 | Cordery et al. | |
| 5,988,897 | A | * | 11/1999 | Pierce et al. | 400/103 |
| 6,009,417 | A | * | 12/1999 | Brookner et al. | 705/401 |
| 6,055,520 | A | * | 4/2000 | Heiden et al. | 705/410 |
| 6,085,126 | A | * | 7/2000 | Mellgren et al. | 700/232 |
| 6,121,565 | A | * | 9/2000 | Allott, III | 209/584 |
| 6,208,980 | B1 | | 3/2001 | Kara | 705/408 |
| 6,282,524 | B1 | * | 8/2001 | Kramer | 705/408 |
| 6,428,219 | B1 | * | 8/2002 | Stier et al. | 400/61 |
| 6,463,354 | B1 | | 10/2002 | Pintsov | |
| 6,526,393 | B1 | | 2/2003 | Fredmann | 705/408 |
| 2003/0192944 | A1 | * | 10/2003 | Sansone et al. | 229/80 |

FOREIGN PATENT DOCUMENTS

| | | | |
|---|---|---|---|
| EP | 0 710 930 A | | 5/1996 |
| WO | WO97/14417 A2 | | 4/1997 |
| WO | WO-01/69914 A2 | * | 9/2001 |

OTHER PUBLICATIONS

Unknown author, "On the Drawing Board: Online Technology for High-Volume Mailers", Dec. 1999, Purchasing, p. 100.*

Pages 58682-58689 from Federal Register, vol. 65, No. 191/Monday, Oct. 2, 2000/Proposed Rules.

"Sweeping Changes proposed in South Africa"; Scrip 2154, Aug. 13, 1996, p. 14, see entire document.

* cited by examiner

*Primary Examiner*—Igor N. Borissov
(74) *Attorney, Agent, or Firm*—Joseph C. Kirincich; Angelo N. Chaclas

(57) ABSTRACT

A method of operating a postage metering system for printing a postage indicium for use with a business reply mail piece. The method includes the step(s) of: (i) transmitting a registration ID number to a data center, the registration ID number being associated a particular mail campaign of which the business replay mail piece is a part; (ii) receiving postage indicium information from the data center, the postage indicium information including delivery address information generated using the registration ID number; and (iii) printing the postage indicium on the business reply mail piece using the postage indicium information.

41 Claims, 5 Drawing Sheets

POSTAGE METERING SYSTEM FOR USE WITH BUSINESS REPLY MAIL

FIELD OF THE INVENTION

This invention relates generally to information based indicia types of postage metering systems. More particularly, in the preferred embodiments, this invention is directed to a system and method for metering business reply mail where the delivery address has already been pre-printed on the business reply mail piece.

BACKGROUND OF THE INVENTION

The Information-Based Indicia Program (IBIP) is a distributed trusted system proposed by the United States Postal Service (USPS) to retrofit and augment existing postage meters using new technology known as information-based indicia. The IBIP relies on digital signature techniques to produce for each mail piece an indicium whose origin cannot be repudiated. Thus, in contrast to traditional postage metering systems employing mechanical printing technology and physical security, the IBIP supports new methods of securely applying postage to mail pieces. Generally, the IBIP requires printing a large, high density, two-dimensional (2-D) bar code on a mail piece. The 2-D barcode encodes various information associated with the mail piece and is subsequently signed with a digital signature.

The USPS has published draft specifications for the IBIP. The INFORMATION BASED INDICIA PROGRAM INDICIUM SPECIFICATION, dated Jun. 13, 1996, and revised Jul. 23, 1997, ("IBIP Indicium Specification") defines the proposed requirements for a new indicium that will be applied to mail being processed using the IBIP technology. The INFORMATION BASED INDICIA PROGRAM POSTAL SECURITY DEVICE SPECIFICATION, dated Jun. 13, 1996, and revised Jul. 23, 1997, ("IBIP PSD Specification") defines the proposed requirements for a Postal Security Device (PSD) that will provide security services to support the creation of a new "information based" postage postmark or indicium that will be applied to mail being processed using the IBIP technology. The INFORMATION BASED INDICIA PROGRAM HOST SYSTEM SPECIFICATION, dated Oct. 9, 1996, defines the proposed requirements for a host system element of the IBIP ("IBIP Host Specification"). The INFORMATION BASED INDICIA PROGRAM KEY MANAGEMENT PLAN SPECIFICATION, dated Apr. 25, 1997, defines the generation, distribution, use and replacement of the cryptographic keys used by the USPS product/service provider and the PSDs ("IBIP KMS Specification"). The specifications are collectively referred to herein as the "IBIP Specifications". Thus, the IBIP Specifications include requirements for interfacing user (customer), postal and postage meter manufacturer infrastructures which are the system elements of the IBIP. Furthermore, the IBIP Specifications set forth the information and printing requirements for the postage indicium.

The user infrastructure, which resides at the user's site, may exist in several different configurations, both of which are well known in the industry. One configuration includes a postage security device (PSD) coupled to a personal computer (PC) system. The PSD is a secure processor-based accounting device that dispenses and accounts for postal value stored therein. In another configuration, no PSD is required at the user's site. Instead, the user simply uses a standard PC and connects to a Data Center to securely download postage indicia for printing.

The IBIP Specifications provide requirements for the indicium that consists of both human-readable data and PDF417 bar code data. The human-readable information includes an originating address, including the 5-digit ZIP Code of the licensing post office, PSD ID/Type number, date of mailing and amount of the applied postage. The bar code region of the indicium elements includes postage amount, PSD ID, user ID, date of mailing, originating address, destination delivery point identification, ascending and descending registers and a digital signature.

The IBIP Specifications require that, for each mail piece, the delivery address and the corresponding postage indicium be generated and printed together and an integral unit. This is to ensure that address cleansing is performed and that there is a one to one correspondence between the delivery address and its associated postage indicium. As a result, the postage metering system must print this unit on the actual mail piece stock or label(s) for later attachment to the mail piece.

Generally, these types of postage metering systems, an example of which is the ClickStamp® Online system from Pitney Bowes Inc. of Stamford, Conn., are intended for the small office and home office (SOHO) market that does not generate large amounts of outgoing mail. However, this market has been slow to embrace the benefits of computer based postage. Instead, many potential customers continue to use other forms of postage payment, such as: stamps and direct post office window transactions.

One reason potential customers are slow to adopt these new systems may be that no good solution exists for applying postage to business reply mail. Business reply mail is typically provided by the sender and is preprinted with various information (delivery address) to encourage the recipient to return it to the sender and facilitate handling by the sender. Generally, many companies and private concerns use business reply mail to solicit information from recipients (current and prospective customers of the sender). As such, business reply mail has a wide variety of uses and is often customized depending upon the needs of the sender. A few examples of the uses for business reply mail are: subscription solicitations, information request responses, proxy statement responses (included with notices of annual stockholder meetings), remittance documents (bill payment) and the like. Oftentimes, the business reply mail is provided to recipients as part of a direct mail campaign, an invoice or as a detachable insert in a periodical magazine or newsletter. Thus, potential customers for using computer based postage receive large amounts of business reply mail.

Because of the requirement of printing the delivery address and the postage indicium together, problems exist when a computer based postage metering system user desires to send a business reply mail piece back to its sender. As discussed above, these types of mail pieces typically have the delivery address (specified by the sender) preprinted. Thus, processing this type of mail piece in conventional fashion would result in one address (generated by the postage metering system) being printed over the top of the other address (preprinted by the sender). Clearly, this is unacceptable. Therefore, several options exist. In a first option, the user may create a wholly new envelope from blank envelope stock and not utilize the business reply mail piece that was provided. This has the disadvantages of requiring the user to incur additional cost by unnecessarily consuming an extra envelope and burdening the sender (now the recipient) because the sender's incoming mail handling systems are most likely adapted to process the business reply mail pieces that they originally provided. Another option is to print labels for the delivery address and the postage indicium, respectively, and affix them to the business reply mail piece. However, there is a risk that the postage labels and their corresponding address labels may become unmatched. All of the label printing option have the disadvantage of requiring the user to incur additional cost by unnecessarily consuming labels and dealing with the complexity of feeding label stock through the printer.

Therefore, the large volume of business reply mail handled today has created the need for an improved computer based postage metering system that handles business reply mail pieces in a more effective manner without compromising the requirements of the IBIP Specifications.

SUMMARY OF THE INVENTION

The present invention provides a method of operating a postage metering system, a method of operating a data center, a method of operating a business reply mail processing system, a data structure for use in processing business reply mail and a business reply mail piece. Generally, this is accomplished by associating a delivery address for a mail campaign, of which the business reply mail piece is a part, with a registration ID number that is subsequently used by a recipient (user) of the business reply mail piece to apply postage to the business reply mail piece.

In accordance with the present invention, there is provided a method of operating a postage metering system for printing a postage indicium for use with a business reply mail piece. The method includes the step(s) of: (i) transmitting a registration ID number to a data center, the registration ID number being associated a particular mail campaign of which the business reply mail piece is a part; (ii) receiving postage indicium information from the data center, the postage indicium information including delivery address information generated using the registration ID number; and (iii) printing the postage indicium on the business reply mail piece using the postage indicium information.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
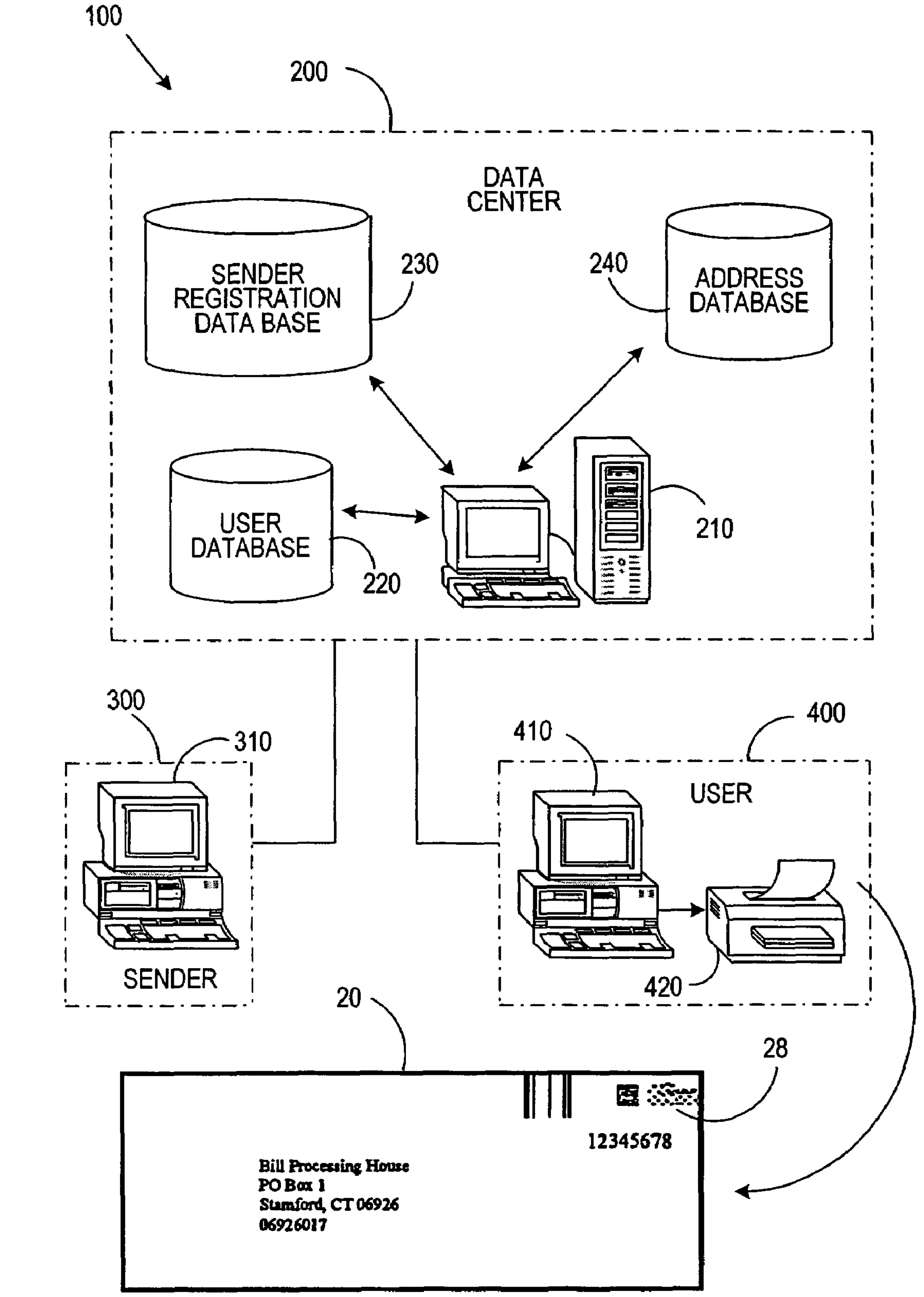
FIG. 1 is a simplified diagrammatic representation of a business reply mail processing system in accordance with the present invention.
Figure 2A:
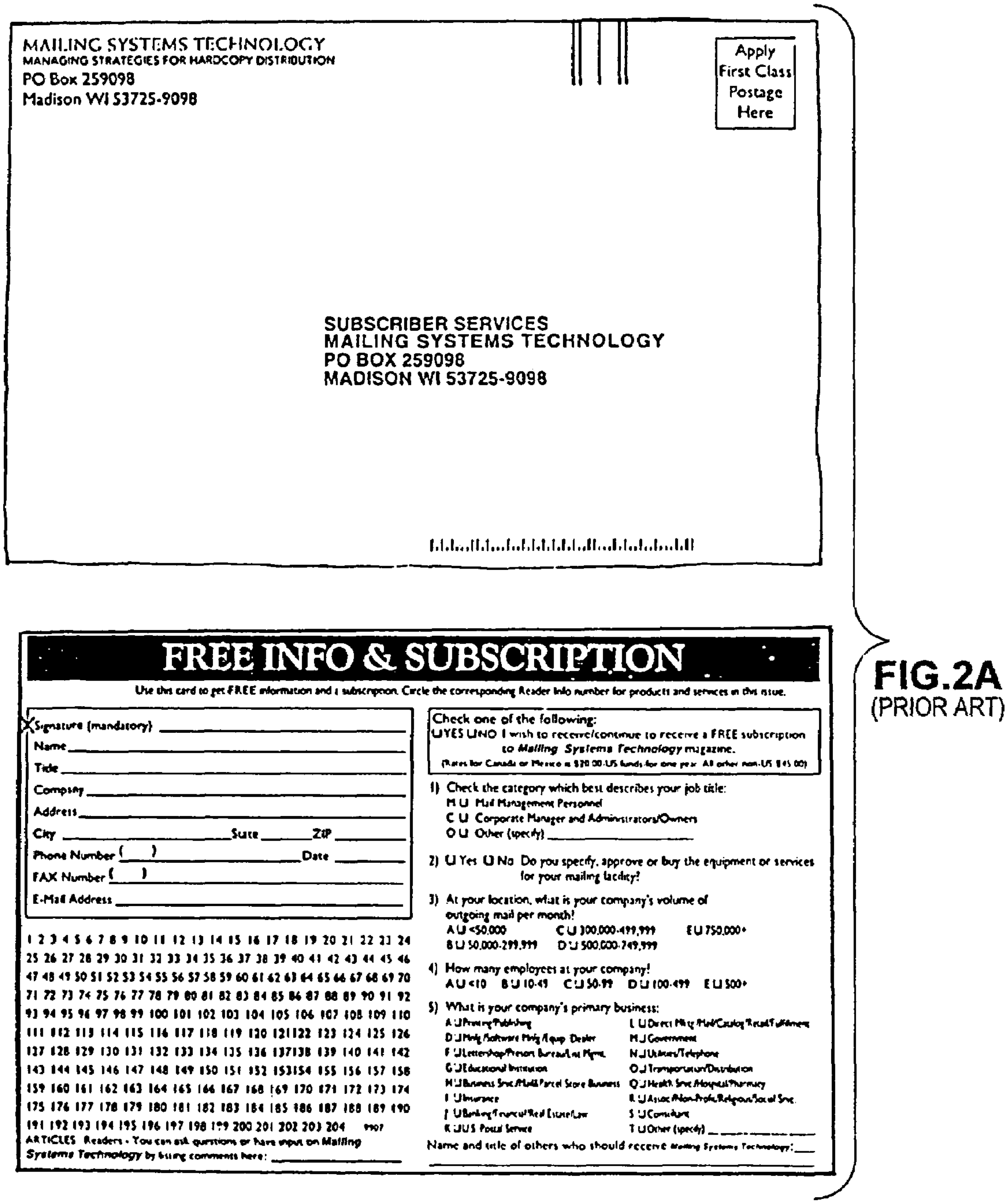
FIG.2A (PRIOR ART)
FIG. 2A is an example of a first business reply mail piece that exists in the prior art.
Figure 2B:
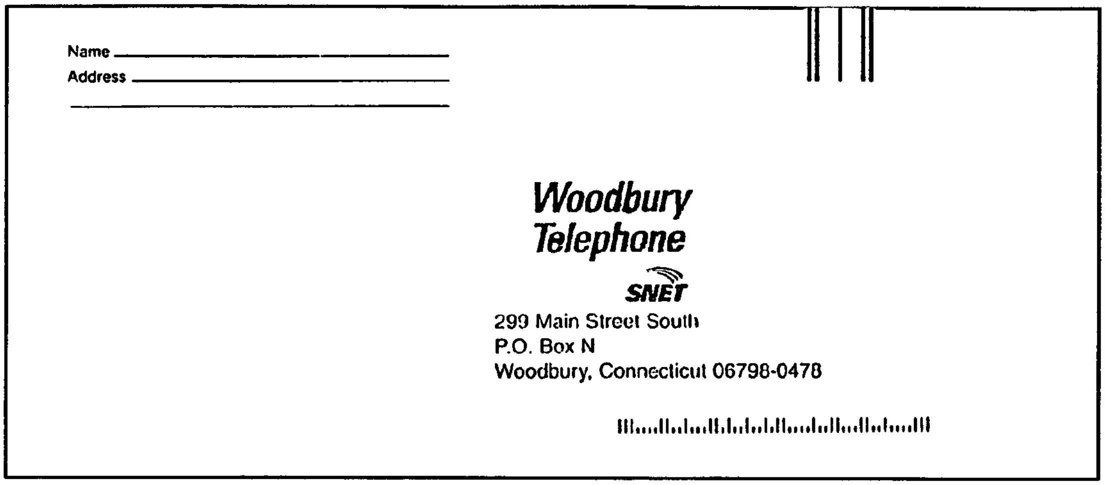
FIG.2B (PRIOR ART)
FIG. 2B is an example of a second business reply mail piece that exists in the prior art.
Figure 2C:
FIG.2C (PRIOR ART)
FIG. 2C is an example of a third business reply mail piece that exists in the prior art.

Referring to FIG. 1, a business reply mail processing system 100 in which the present invention may be incorporated is shown. The processing system 100 includes a data center 200, a sender system 300 in operative communication with the data center 200 and a user or customer postage metering system 400 also in operative communication with the data center 200. Generally, the data center 200, the sender system 300 and the postage metering system 400 work cooperatively to facilitate the application of postage on a business reply mail piece (BRMP) 20. Referring to FIGS. 2A, 2B and 2C, examples of various types of business reply mail pieces in the prior art are shown.

The data center 200 may be comprised of any suitable combination of computer (hardware, software and peripheral devices) systems. Generally, the data center 200 works cooperatively with the postage metering system 400 to generate a postage indicium 28 in response to and corresponding with information supplied by a user (not shown) of the postage metering system 400. The data center 200 includes a computing system (main frame computer, network server, or the like) 210 in operative communication with a user database 220, a sender registration database 230 and an address database 240. The databases 220, 230 and 240 may be stored in any suitable permanent memory device, such as: a hard disk drive, an optical disk drive, magnetic tapes or other conventional storage device. A more detailed description of the operation of the data center 200 and the databases 220, 230 and 240 is provided below.

The sender system 300 may be comprised of any suitable combination of printing (not shown), mailing (not shown) and/or computer systems. As described above, the business reply mail pieces are generally distributed as enclosures with or attachments to other outgoing mail pieces (not shown) generated by the mail campaign sender. Thus, those skilled in the art will recognize that the configuration of the sender system 300 is highly dependent upon the detailed requirements of each specific mail campaign. Also, since the details of the sender system 300 are not necessary for an understanding of the present invention, its description will be kept to a minimum with additional comments to provide background information as necessary. Preferably, the sender system 300 is in electronic communication with the data center 200 over any suitable computer based network using a personal computer (PC) 310, or any other suitable computing system. However, it is within the contemplation of this invention that this communication could take on any form, such as: person to person, person to voice response system, off line correspondence (physical mail or electronic mail), or the like.

The postage metering system 400 may be of any conventional type that is compliant with the IBIP Specifications, such as the ClickStamp® Online metering system available from Pitney Bowes Inc. of Stamford, Conn. Generally, the postage metering system 400 includes a computer system 410, such as a personal computer (PC) running appropriate application software, and a printer 420 (laser printer, thermal transfer printer, thermal direct printer, ink jet printer, or the like) interfaced with the computer system 410 using conventional communication techniques (RS 232, LAN, WAN, TCP/IP, or the like). Using the computer system 410, the user initiates a transaction session with the data center 200 for the purpose of printing postage. The computer system 410 and the data center 200 work cooperatively to generate and print a postage indicium 28. Further information about the details of this transaction session and the exchange of information between the data center 200 and the computer system 410 are provided in U.S. Pat. Nos. 5,835,689; 5,781,438 and 5,781,634; all of which are specifically incorporated herein as reference. As discussed above, the postage metering system 400 may print directly on the mail piece to produce the postal indicium or on label stock for subsequent application onto the mail piece.

Figure 3:
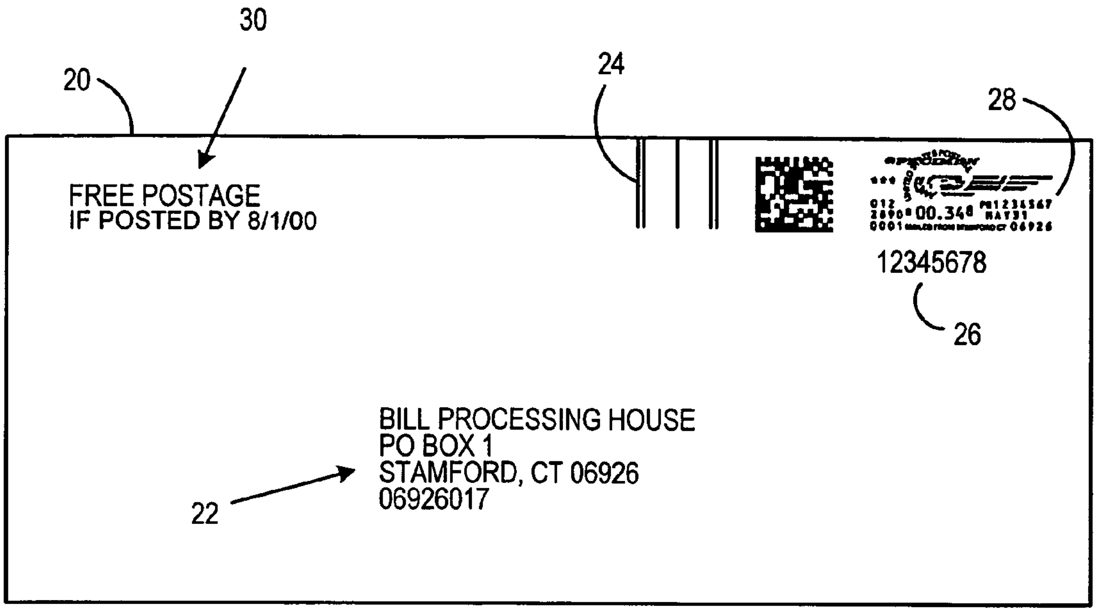
FIG. 3 is a simplified schematic representation of a business reply mail piece in accordance with the present invention.

Referring to FIG. 3 in view of FIG. 1, an enlarged view of a simplified schematic representation of the BRMP 20 in accordance with the present invention is shown. Generally, the BRMP 20 may be a post card, an envelope or a parcel. Those skilled in the art will recognize that the configuration of the BRMP is defined by the sender of the mail campaign and that the concepts of the present invention are applicable to any configuration. Therefore, for the sake of brevity and clarity, the BRMP 20 shown is of an envelope style and no further mention of the other configurations will be provided. The BRMP 20 includes a delivery address 22, a facer identification mark (FIM) 24, optionally, a registration ID number 26, optionally, the postal indicium 28 (printed by the user as described in further detail below) and a quick response incentive message 30, optionally provided by the sender and intended for the user. The delivery address 22 is specified and pre-printed on the BRMP 20 by the sender. The FIM 24 may be pre-printed by the sender or, in the alternative printed by the user using the postage metering system 400. The registration ID number 26 is provided by the data center 200 and in the most preferred embodiment is pre-printed on the BMRP 20 by the sender. However, the sender may provide the ID number 26 to the user in any other manner. The message 30 may also be optionally pre-printed on the BRMP 20 by the sender to communicate some additional information to the user.

Figure 4:
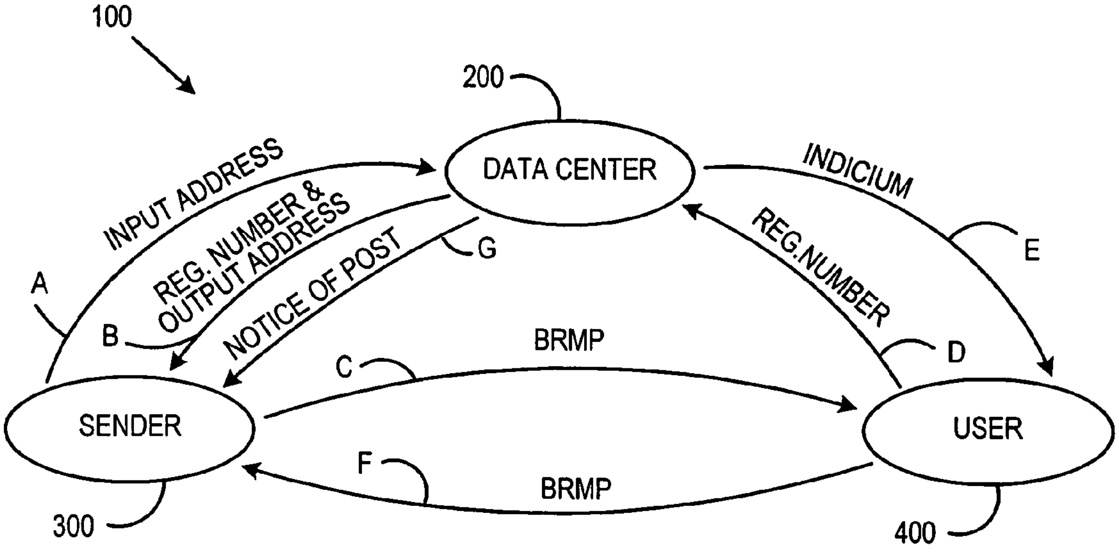
FIG. 4 is a schematic diagram of the information flow for a life cycle of a business reply mail piece in accordance with the present invention.
Figure 5:
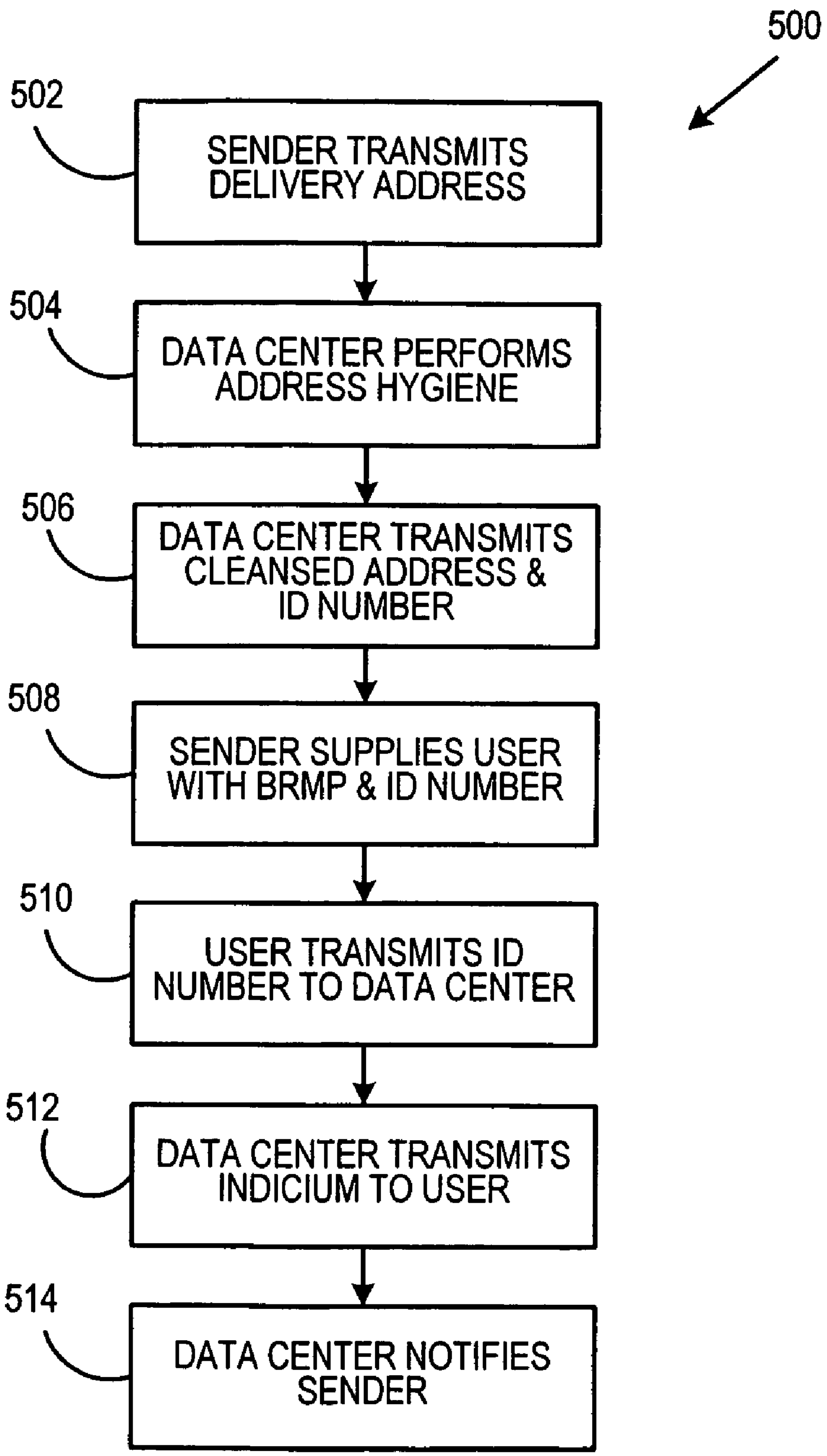
FIG. 5 is a schematic diagram of a flow chart describing the operational characteristics of the life cycle of a business reply mail piece in accordance with the present invention.

Referring to FIG. 4 in view of FIGS. 1 and 3, a schematic diagram of the information flow, necessary for an understanding of the present invention, between the sender system 300 and the data center 200 and the data center 200 and the postage metering system 400 during a life cycle of the BRMP 20 is shown. Generally, the arrows have been labeled with reference letters A, B, C, D, E, F and G to show the sequence of events in the life cycle of the BRMP 20. The life cycle commences when the sender initiates the mail campaign and concludes when the sender receives the BRMP 20 back from the user. With the structure of the business reply mail piece processing system 100 described as above, the operational characteristics will now be described. Referring to FIG. 5, while referencing the structure of FIGS. 1, 3 and 4, a flow chart 500 describing the operational characteristics of the relevant portions of the life cycle of BRMP 20 in accordance with the present invention is shown.

At 502, the life cycle commences when the sender system 300 transmits a delivery address to the data center 200. It is assumed that the sender has previously established a relationship with the data center 200, such that the data center 200 recognizes the sender from a plurality of different senders. Thus, the sender registration database 230 may contain a plurality of sender accounts where each sender account includes contact information (mailing address, e-mail address, billing, etc.) and other data. Next, at 504, the data center 200 performs address hygiene (address correction) in conventional fashion by cross referencing the input delivery address with the address database 240 to ensure the accuracy and completeness of the delivery address. Next, at 506, the data center 200 generates the registration ID number 26 that is unique to that delivery address and transmits it to the sender. Preferably, the ID number 26 also identifies the particular sender associated with the delivery address. As an option, the data center 200 may also transmit the cleansed delivery address if corrections to the input delivery address were required. Those skilled in the art will appreciate that the ID number 26 may be comprised of any combination of human and/or machine readable characters in any conventional format, such as: alphanumeric or bar code. As an option, the ID number 26 should also contain check digits or other suitable technique so that a determination can be made if the user transmits the ID number correctly. Next, at 508, the sender supplies the ID number 26 to potential users by incorporating the ID number 26 into a mail campaign. This is preferably accomplished by pre-printing the ID number 26 directly on the BRMP 20 in proximity to a space reserved for the postage indicium 28. However, the ID number may be supplied to the user along with a statement or some other communication from the sender. It should be understood that the ID number 26 is thus the same for every BRMP 20 that a particular sender desires to receive at a designated delivery address. Thus, the BRMP 20 is still a uniform stock item that does not differ from mail piece to mail piece or user to user.

For the sake of clarity, it is assumed that the user desires to use the BRMP 20 to communicate with the sender. Next, at 510, the user initiates a postage transaction session with the data center 200 via the postage metering system 300 and transmits the ID number 26 to the data center 200 in place of transmitting a delivery address. Thus, the user experience with the postage metering system 300 and the data center 200 is substantially the same as for traditional postage transactions that require input of the delivery address 22, except that the user inputs the ID number 26. Next, at 512, the data center 200 uses the ID number 26 to search the sender registration database 230 for the delivery address 22 that corresponds to the ID number 26 and uses the stored delivery address to generate and transmit the postage indicium 28 to the postage metering system 400. Those skilled in the art will recognize that the postage metering system 400 forgoes printing the delivery address 22. This is properly coordinated between the data center 200 and the postage metering system 400. Next, at 514, the data center 200 may optionally send a message (preferably by e-mail) to the sender system 310 indicating that the user has dispatched the BRMP 20.

Based on the above description and the associated drawings, it should now be apparent that the present invention improves many aspects of applying postage to business reply mail pieces. For example, the users benefit in that: (i) they are able to use the pre-printed BRMP 20 and do not have to consume their own envelope or label stock; and (ii) entry of a three or four line delivery address 22 is simplified. As another example, the data center 200 benefits in that address hygiene occurs once for a mail campaign and not for each transaction session at the user end. This saves valuable time and computer resources. As another example, it should be clear that according to the present invention, the postage indicium 28 has embedded within it, as required by the IBIP Specifications, a post office zip code that matches the post net bar code that is typically already printed on the BRMP 20 (not shown) by the sender.

Referring to FIGS. 1, 3 and 4, as a further optional aspect of the present invention, the sender may wish to subsidize the postage associated with the BRMP 20. Traditionally, senders have subsidized the cost of postage by applying for a permit with the United States Postal Service (USPS). An example of such a mail piece is shown in FIG. 2C. However, this postage paid BRMP 20 does not provide any incentive for the user to respond quickly. Thus, in instances when the sender would like a quick response (bill payment, etc.), the user has no particular motivation to do so. Also, the sender must make an application to the USPS to obtain the permit number.

On the other hand, the sender may utilize the data center 200 to subsidize the postage by providing an appropriate authorization to the data center 200. Thus, when the user contacts the data center 200 and transmits the ID number 26, the data center 200 can invoice the sender (instead of the user) for the postage. Most preferably, the subsidy may have an expiration date or a diminishing schedule. The message 30 indicates that the cost of postage is fully subsidized if the BRMP 20 is posted by a specified date. Therefore, associated with the ID number 26 in the sender registration database 230 is information about any postage subsidy to by applied to the BRMP 20 and any relevant expiration dates (if any). Those skilled in the art will recognize that this type of capability eliminates the need for the sender to take out permit numbers with the USPS and provides another mechanism for motivating users to transmit the BRMP 20 in a timely manner.

Optionally, if the mail campaign is such that time sensitive responses are required (proxy votes, limited time offer coupons, etc.), then a further beneficial feature may be incorporated into the present invention. The sender may provide the data center 200 with a predetermined expiration date. If the user contacts the data center 200 after the expiration date then the data center 200 will inform the user of such. Thus, the user has the opportunity to save postage by foregoing the tardy mailing that would not have its desired effect even if it were mailed.

Many features of the preferred embodiment represent design choices selected to best exploit the inventive concepts as implemented in a particular business reply mail processing environment as pertaining to traditional response card type business reply mail. However, those skilled in the art will recognize that various modifications and adaptations can be made without departing from the spirit of the present invention. For example, any amount of subsidy, full or partial, and any relevant time frame, infinite or limited, may be applied to the subsidy. Also, the message 30 need not necessarily be applied to the BRMP 20, but may be communicated to the user in some other convenient manner.

As another example, the data center 200 may also possess additional report generation capabilities. For each ID number 26, a report may be automatically prepared on a periodic basis about the status of the mail campaign, such as: the number of BRMPs 20 that have been processed since the last reporting period, the total number of BRMPs 20 that have been processed and other pertinent information.

As yet another example, the data center 200 may not issue the registration ID number 26. Instead, the data center 200 may allow the sender to specify the registration ID number 26 so long as it does not conflict with any other previously existing ones.

As yet still another example, the sender may specify more then one delivery address to the data center for the same ID number 26. Thus, the sender would leave the delivery address 22 blank and define other parameters for the data center 200 to use in determining which of the delivery addresses to use. For instance, based on the timeliness of the user contacting the data center 200, the sender may desire that the BRMP 20 be sent to different delivery addresses 22. Other parameters may be for payment types of responses where the BRMP 20 that are likely to include large amounts are sent to a different delivery address 20 for expedited handling. In this instance, the sender may define these users to the data center 200 or provide the user with a code to transmit to the data center 200 along with or as a component of the ID number 26.

As still yet another example, the data center 200 may periodically download its databases to the postage metering system 400 so that much of the activity described above may occur "off-line" at the postage metering system 400.

Therefore, the inventive concept in its broader aspects is not limited to the specific details of the preferred embodiments described above, but is defined by the appended claims and their equivalents.

What is claimed is:

1. A method of operating a postage metering system for printing a postage indicium subsidized by a mail campaign sender for use with a business reply mail piece, the method comprising the step(s) of:

receiving at the postage metering system from the mail campaign sender a registration ID number in human readable form, said registration ID number is associated with a delivery address previously defined by the mail campaign sender;

transmitting the registration ID number from the postage metering system to a data center;

receiving postage indicium information at the postage metering system from the data center, the postage indicium information generated using the registration ID number and including data relating to the delivery address; and printing the postage indicium on the business reply mail piece at the postage metering system using the postage indicium information.

2. The method of claim 1, further comprising the step(s) of:

receiving at the postage metering system from the data center the delivery address that has been selected by the data center from a plurality of delivery addresses according to parameters associated with the user of the postage metering system; and printing the delivery address on the business reply mail piece at the postage metering system.

3. The method of claim 2, further comprising the step(s) of:

receiving a subsidy provided by the data center to a user of the postage metering system for mailing the business reply mail piece.

4. A method of operating a data center for generating postage indicium information for use with printing a postage indicium on a business reply mail piece, the method comprising the step(s) of:

receiving a delivery address at the data center in human readable form from a mail campaign sender corresponding to a mail campaign of which the business reply mail piece is a part;

generating at the data center a registration ID number corresponding to the delivery address;

providing the registration ID number to the mail campaign sender;

establishing a transaction session with a postage metering system;

receiving the registration ID number at the data center from the postage metering system;

generating the postage indicium information at the data center using the registration ID number and data relating to the delivery address; and providing the postage indicium information to the postage metering system for use in printing the postage indicium on the business reply mail piece.

5. The method of claim 4, further comprising the step(s) of:

performing address hygiene on the delivery address; and transmitting a hygiened addressed to the mail campaign sender.

6. The method of claim 5, further comprising the step(s) of:

providing a subsidy to a user of the postage metering system for mailing the business reply mail piece; and charging the subsidy to the mail campaign sender.

7. The method of claim 6, further comprising the step(s) of:

receiving an expiration date from the mail campaign sender beyond which the business reply mail piece is no longer wanted by the mail campaign sender that is associated with the registration ID number; and providing a warning to the user of the postage metering system if the user of the postage metering system contacts the data center after the expiration date attempting to obtain postage for the business reply mail piece.

8. The method of claim 4, further comprising the step(s) of:

receiving an expiration date from the mail campaign sender beyond which the business reply mail piece is no longer wanted by the mail campaign sender that is associated with the registration ID number; and providing a warning to the user of the postage metering system if the user of the postage metering system contacts the data center after the expiration date attempting to obtain postage for the business reply mail piece.

9. A method of operating a business reply mail processing system by a mail campaign sender, the method comprising the step(s) of:

associating a delivery address with a particular mail campaign which includes a business reply mail piece;

providing the to a data center;

receiving from the data center a registration ID number associated with the delivery address; and providing the registration ID number, the business reply mail piece and delivery address in human readable form to a user of a postage metering system for printing by said user of a postal indicium on the business reply mail piece including data relating to the delivery address.

10. The method of claim 9, further comprising the step(s) of:

receiving from the data center a new hygiened address representing a version of the delivery address prior to supplying the registration ID number and the business reply mail piece to the user of the postage metering system, where the new hygiened address is to be used as the delivery address.

11. The method of claim 10, further comprising the step(s) of:

printing the registration ID number on the business reply mail piece.

12. The method of claim 11, further comprising the step(s) of:

authorizing the data center to provide a subsidy to the user of the postage metering system for mailing the business reply mail piece; and authorizing the data center to charge the subsidy to the mail campaign sender.

13. The method of claim 12, further comprising the step(s) of:

providing the data center with an expiration date beyond which the business reply mail piece is no longer wanted by the mail campaign sender that is associated with the registration ID number; and authorizing the data center to warn the user of the postage metering system if the user of the postage metering system contacts the data center after the expiration date attempting to obtain postage for the business reply mail piece.

14. The method of claim 9, further comprising the step(s) of:

providing the data center with an expiration date beyond which the business reply mail piece is no longer wanted by the mail campaign sender that is associated with the registration ID number; and authorizing the data center to warn the user of the postage metering system if the user of the postage metering system contacts the data center after the expiration date attempting to obtain postage for the business reply mail piece.

15. A computer readable medium having computer readable instructions embedded therein which, when executed by a computer, causing said computer to perform a method for operating a data center for generating postage indicium for use with printing said postage indicium on a business reply mail piece, said method comprising:

establishing a plurality of mail campaign sender accounts associated with respective mail campaign senders, where each of the plurality of mail campaign sender accounts includes a registration ID number associated with a delivery address and a particular mail campaign of which said business reply mail piece is a part, respectively;

receiving said delivery address at the data center in human readable form from the mail campaign sender corresponding to the mail campaign of which the business reply mail piece is a part;

generating at the data center a registration ID number corresponding to the delivery address;

providing the registration ID number to the mail campaign sender;

establishing a transaction session with a postage metering system;

receiving the registration ID number from the postage metering system;

using said registration ID number to generate a postage indicium; and providing said postage indicium and delivery address in human readable form to of the postage metering system.

16. The computer readable medium of claim 15, further comprising the step of:

determining for at least one of the plurality of mail campaign sender accounts whether or not the respective mail campaign sender authorizes a subsidy to a user of the postage metering system for mailing the business reply mail piece.

17. The computer readable medium of claim 16, further comprising:

including for at least one of the plurality of mail campaign sender accounts an expiration date, beyond which the business reply mail piece is no longer wanted by the mail campaign sender, associated with the registration ID number to determine whether or not to provide a warning to the user.

18. The computer readable medium of claim 15, further comprising:

including for at least one of the plurality of mail campaign sender accounts an expiration date, beyond which the business reply mail piece is no longer wanted by the mail campaign sender, associated with the registration ID number to determine whether or not to provide a warning to the user.

19. The method of claim 3, further comprising the step(s) of:

receiving the subsidy only if the business reply mail piece is posted within a specified time period defined by the mail campaign sender.

20. The method of claim 1, further comprising the step(s) of:

receiving a subsidy provided by the data center to the user of the postage metering system for mailing the business reply mail piece.

21. The method of claim 20, further comprising the step(s) of:

receiving the subsidy only if the business reply mail piece is posted within a specified time period defined by the mail campaign sender.

22. The method of claim 1, further comprising the step(s) of:

displaying a warning to the user of the postage metering system if the user of the postage metering system contacts the data center after an expiration date, defined by the mail campaign sender and beyond which the business reply mail piece is no longer wanted by the mail campaign sender, attempting to obtain postage for the business reply mail piece, where the expiration date is associated with the registration ID number.

23. The method of claim 4, further comprising the step(s) of:

providing a subsidy to the user of the postage metering system for mailing the business reply mail piece; and charging the subsidy to the mail campaign sender.

24. The method of claim 23, further comprising the step(s) of:

providing the subsidy only if the business reply mail piece is posted within a specified time period defined by the mail campaign sender.

25. The method of claim 4, further comprising the step(s) of:

receiving a plurality of delivery addresses from the mail campaign sender;

storing said plurality of delivery addresses; and selecting the delivery address for the business reply mail piece from the plurality of delivery addresses according to parameters associated with the user of the postage metering system.

26. The method of claim 6, further comprising the step(s) of:

receiving a plurality of delivery addresses from the mail campaign sender;

storing said plurality of delivery addresses; and selecting the delivery address for the business reply mail piece from the plurality of delivery addresses according to parameters associated with the user of the postage metering system.

27. The method of claim 4, further comprising the step(s) of:

providing a notification to the mail campaign sender when the business reply mail piece is posted by the user of the postage metering system.

28. The method of claim 6, further comprising the step(s) of:

providing a notification to the mail campaign sender when the business reply mail piece is posted by the user of the postage metering system.

29. The method of claim 12, further comprising the step(s) of:

specifying a time period in which the business reply mail piece must be posted to receive the subsidy; and authorizing the data center to charge the subsidy to the mail campaign sender only if the business reply mail piece is posted within the specified time period.

30. The method of claim 9, further comprising the step(s) of:

specifying an expiration date beyond which the business reply mail piece is no longer wanted by the mail campaign sender; and authorizing the data center to provide a warning to the user of the postage metering system if the user of the postage metering system contacts the data center after the expiration date attempting to obtain postage for the business reply mail piece.

31. The method of claim 9, further comprising the step(s) of:

defining a plurality of delivery addresses; and establishing parameters for use in determining a selected one of the plurality of delivery address to use as the delivery address on the business reply mail piece, where the parameters are associated with the user of the postage metering system.

32. The computer readable medium of claim 15, further comprising:

including for some of the plurality of mail campaign sender accounts an expiration date beyond which the business reply mail piece is no longer wanted by the mail campaign sender.

33. The computer readable medium of claim 15, further comprising:

including for some of the plurality of mail campaign sender accounts: (i) a plurality of delivery addresses; and (ii) parameters for use in determining a selected one of the plurality of delivery addresses to use as the delivery address on the business reply mail piece, where the parameters are associated with the user of the postage metering system.

34. The computer readable medium of claim 17, further comprising:

including for some of the plurality of mail campaign sender accounts an expiration date beyond which the business reply mail piece is no longer wanted by the mail campaign sender.

35. The computer readable medium of claim 17, further comprising:

including for some of the plurality of mail campaign sender accounts: (i) a plurality of delivery addresses; and (ii) parameters for use in determining a selected one of the plurality of delivery addresses to use as the delivery address on the business reply mail piece, where the parameters are associated with the user of the postage metering system.

36. The method of claim 4, further comprising the step(s) of:

sending a message to the mail campaign sender indicating that the user of the postage metering system has dispatched the business reply mail piece.

37. The method of claim 7, further comprising the step(s) of:

sending a message to the mail campaign sender indicating that the user of the postage metering system has dispatched the business reply mail piece.

38. The method of claim 24, further comprising the step(s) of:

sending a message to the mail campaign sender indicating that the user of the postage metering system has dispatched the business reply mail piece.

39. The method of claim 9, further comprising the step(s) of:

receiving a message from the data center indicating that the user of the postage metering system has dispatched the business reply mail piece.

40. The method of claim 14, further comprising the step(s) of:

receiving a message from the data center indicating that the user of the postage metering system has dispatched the business reply mail piece.

41. The method of claim 30, further comprising the step(s) of:

receiving a message from the data center indicating that the user of the postage metering system has dispatched the business reply mail piece.

* * * * *